(12) United States Patent
Wakai et al.

(10) Patent No.: US 7,891,313 B2
(45) Date of Patent: Feb. 22, 2011

(54) GRAVURE COATING APPARATUS

(75) Inventors: Yutaka Wakai, Aichi (JP); Tomofumi Yanagi, Osaka (JP)

(73) Assignee: Panasonic Corporation, Osaka (JP)

( * ) Notice: Subject to any disclaimer, the term of this patent is extended or adjusted under 35 U.S.C. 154(b) by 991 days.

(21) Appl. No.: 11/727,205

(22) Filed: Mar. 23, 2007

(65) Prior Publication Data
US 2008/0083367 A1 Apr. 10, 2008

(30) Foreign Application Priority Data
Mar. 24, 2006 (JP) .............................. 2006-083164

(51) Int. Cl.
*B05C 1/08* (2006.01)
(52) U.S. Cl. ..................... 118/204; 118/203; 15/256.51
(58) Field of Classification Search .................. 118/204
See application file for complete search history.

(56) References Cited

U.S. PATENT DOCUMENTS 1,654,214 A * 12/1927 Evans .......................... 118/221
2,131,606 A * 9/1938 Von Hofe .................... 118/262
4,530,594 A * 7/1985 Adachi ....................... 399/360
2002/0029790 A1 * 3/2002 Corti et al. ..................... 134/6

FOREIGN PATENT DOCUMENTS

| JP | 9-298058 | 11/1997 |
| JP | 2001-327906 | 11/2001 |
| WO | WO 2005/081336 A1 | 9/2005 |

* cited by examiner

*Primary Examiner*—Parviz Hassanzadeh
*Assistant Examiner*—Charles J Capozzi
(74) *Attorney, Agent, or Firm*—McDermott Will & Emery LLP

(57) ABSTRACT

A gravure coating apparatus is provided for forming a stripe-shaped coating film by means of a gravure roll having a groove between plate cylinders. The apparatus has a scraping member having: side edges each of which contacts an edge surface of one of the plate cylinders so as to be approximately aligned along the radial direction of the gravure roll and scrapes a coating solution on the edge surface; a groove-like passage for discharging the coating solution, the groove-like passage being formed in a generally central portion of the inner peripheral surface along the bottom surface of the groove so as to be aligned along the rotation direction of the gravure roll; and a tapered surface which guides the coating solution from the edges to the groove-like passage. The scraping member is disposed in the groove, whereby the coating film formed by the plate cylinders is made uniform over the entire surface using a simple configuration.

5 Claims, 3 Drawing Sheets

US 7,891,313 B2

GRAVURE COATING APPARATUS

The present disclosure relates to subject matter contained in priority Japanese Patent Application No. 2006-83164 filed on Mar. 24, 2006, the contents of which is herein expressly incorporated by reference in its entirety.

BACKGROUND OF THE INVENTION

1. Field of the Invention

The present invention relates to a gravure coating apparatus, and in particular, to a gravure coating apparatus which forms stripe-shaped coating film by means of a gravure roll having a groove between plate cylinders.

2. Description of the Related Art

In recent years, batteries have been increasingly used as a power source of various devices. Accordingly, there has been a strong demand for an increase in the capacity and output power of batteries and for a reduction in the thickness and weight thereof. Lithium ion rechargeable batteries, lithium polymer rechargeable batteries, nickel metal hydride batteries, and the like have been used as batteries capable of satisfying the demand. These batteries are being improved to further increase the capacity and output power and also to reduce the cost and stabilize the life.

As an electrode plate for such batteries, there is known an electrode plate constituted by forming coated portions containing an active material on one or both sides of a metal core serving as a collector. The coated portion is formed by coating the surface of the core with a paste containing the active material. In order to reduce manufacturing cost in a method for manufacturing such an electrode plate, various methods have been known (see, for example, Japanese Patent Laid-open Publication No. 2001-327906). Specifically, while a strip-like core is fed in its longitudinal direction, a plurality of stripes of a coating layer are formed so as to be separated in the width direction of the core with an uncoated portion serving as a lead portion formed between the stripes. After the coating layer is dried and compressed, the core is subjected to cutting, whereby an electrode plate having a desired size is manufactured with high productivity.

Furthermore, in various rechargeable batteries, a separator formed of a porous thin film sheet is disposed between positive and negative electrode plates in order to insulate the electrode plates from each other and to hold an electrolytic solution. In order to prevent foreign materials from piercing the separator or to prevent an internal short circuit from occurring and spreading when heat damage occurs, a method has been proposed in, for example, the pamphlet of International Publication No. WO2005/081336, In this method, a porous insulating film, which serves as a protection film for the coated portion and which contains an inorganic oxide filler such as alumina powder and a resin binder, is formed on the surface of a coated portion of an electrode plate. Specifically, the protection film is coated by use of a gravure roll and is formed such that a lead formation portion is not coated.

Furthermore, as a method for forming an active material layer on the surface of a collector, a method is known in which an active material layer is formed by printing a coating solution in a pattern by means of a gravure printing method (see, for example, Japanese Patent Laid-Open Publication No. Hei 9-298058).

Hence, it has been conceived that a technique similar to those described in the abovementioned pamphlet of is International Publication No. WO2005/081336 and Japanese Patent Laid-Open Publication No. Hei 9-298058 is utilized in an apparatus for forming a protection film composed of a porous insulating film on the surface of the abovementioned stripe-shaped coated portions formed on the surface of a strip-like core. That is, a protection film is formed by means of gravure coating. Specifically, as shown in FIGS. 3 and 4, a strip-like electrode plate 11 having a plurality of coated portions 13 formed in stripes on the surface of a core 12 is guided by guide rollers 14 and is fed in its longitudinal direction. A coating solution 17 containing an inorganic oxide filler and a binder is applied to plate cylinders 16 of a gravure roll 15. Then, the coating solution 17 in the plate cylinders 16 is transferred to the surface of each of the coated portions 13 to thereby form a protection film 18.

However, it has been found that, when the coating solution 17 is transferred from each of the plurality of the plate cylinders 16 provided in the gravure roll 15 to the plurality of the stripe-shaped coated portions 13, the coated amount of the coating solution 17 is large at both the side edge portions of each of the coated portions 13, as shown in FIG. 5. Since the protection film 18 cannot be formed uniformly over the entire surface of each of the coated portions 13, the length of a transportation path of ions becomes large in the thick portions of the protection film 18, and the power generation function of the electrode plate 11 deteriorates, thereby causing a problem that the output power, capacity, and life of a battery is adversely affected.

As above, the cause of the increase of the coated amount of the coating solution 17 in the side edge portions of the coated portions 13 has been investigated. Consequently, it has been found that the increase is caused since the coating solution 17 tends to be collected in the edge portions of the plate cylinders 16. Hence, as shown in FIGS. 6A and 6B, a scraper 19 is provided to scrape the coating solution 17 sticking to an edge surface 16a of the plate cylinder 16 of the gravure roll 15. However, the scraper 19 made of a polyethylene terephthalate (PET) thin plate must be appropriately pressed against the edge surface 16a of the plate cylinders 16. Therefore, as the scraper 19 wears, the pressing pressure must be controlled according to the wear. However, it is difficult to place a pressing pressure mechanism in a narrow groove between the plate cylinders 16, and the scraper 19 must be replaced frequently since it wears rapidly. Therefore, a problem arises in that the productivity deteriorates due to the replacement operations.

SUMMARY OF THE INVENTION

In light of the foregoing problems, it is an object of the present invention to provide a gravure coating apparatus which is capable of forming, by means of a gravure roll having a groove between a plurality of plate cylinders, a stripe-shaped coating film uniformly over the entire surface of the plate cylinders and which employs a simple configuration providing high productivity.

The gravure coating apparatus of the present invention is a gravure coating apparatus for forming a stripe-shaped coating film by means of a gravure roll having a groove between a plurality of plate cylinders. The apparatus includes a scraping member disposed in the groove and having: side edges each of which contacts an edge surface of one of the plate cylinders so as to be generally aligned along a radial direction of the gravure roll and scrapes a coating solution on the edge surface; a groove-like passage for discharging the coating solution, the groove-like passage being formed in a generally central portion of an inner peripheral portion along a bottom surface of the groove so as to be aligned along a rotation direction of the gravure roll; and a tapered surface which guides the coating solution from the side edges to the groove-like passage.

In this configuration, the coating solution sticking to the edge surfaces of the plate cylinders is properly scraped by the side edges of the scraping member disposed in the groove between the plate cylinders. In addition to this, the scraped coating solution smoothly flows toward the groove-like passage through the tapered surface and is discharged to the central portion of the bottom surface of the groove through the groove-like passage. Then, the coating solution is returned to a solution pool without sticking again to the edge surfaces of the plate cylinders. Consequently, the coating film by means of the plate cylinders is formed uniformly over the entire surface of the plate cylinders. Furthermore, since a pressing mechanism necessary for a conventional scraper composed of a thin plate is eliminated, the scraping member has a simple configuration. Thus, even when the width of the groove is small, the coating solution is properly scraped. Furthermore, since the replacement of the scraping member due to wear of the side edges is hardly required, the manufacturing process is not required to be interrupted for the replacement operations. High productivity is therefore ensured.

Preferably, the scraping member is formed of a material, for example, a fluororesin such as polytetrafluoroethylene, having repellency to the coating solution. In this case, the coating solution scraped by the side edges thereof is smoothly discharged through the groove-like passage.

Preferably, the coating solution contains: an inorganic oxide filler which forms a porous insulating film on a surface of a coated portion containing an active material for an electrode plate of a battery; and a binder therefor. When the present invention is applied to such a case, the effect on the improvement of the productivity in a process of manufacturing an electrode plate is greatly exerted.

According to the gravure coating apparatus of the present invention, the coating solution sticking to the edge surfaces of the plate cylinders is properly scraped by the scraping member disposed in the groove between the plate cylinders and is returned to the solution pool. The coating film formed by the plate cylinders is thereby made uniform over the entire surface. Furthermore, even when the width of the groove is small, the above effect is obtained by simply placing the scraping member in the groove. Moreover, since the replacement operations due to wear are not required, high productivity is ensured.

The foregoing and other objects and features of the present invention will become more apparent from the following detailed description and the accompanying drawings.

DETAILED DESCRIPTION OF THE PREFERRED EMBODIMENTS

Hereinafter, with reference to FIGS. 1A to 2B, a description is given of an embodiment in which, in a process for manufacturing a strip-like electrode plate having a stripe-shaped coated portion, the present invention is applied to a gravure coating apparatus for forming on the surface of the coated portion a protection film composed of a porous insulating film.

Figure 1A:
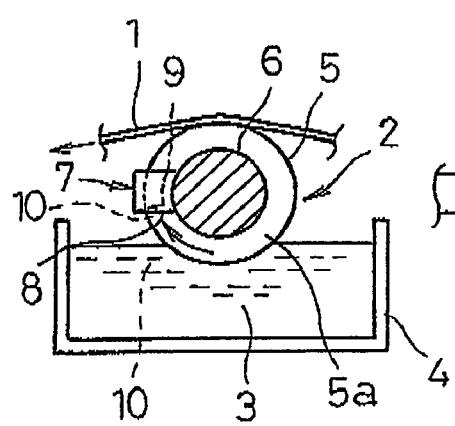
FIGS. 1A and 1B show an embodiment of a gravure coating apparatus of the present invention, FIG. 1A being a schematic configuration diagram of a main part, FIG. 1B being a front view of a gravure roll.
Figure 1B:
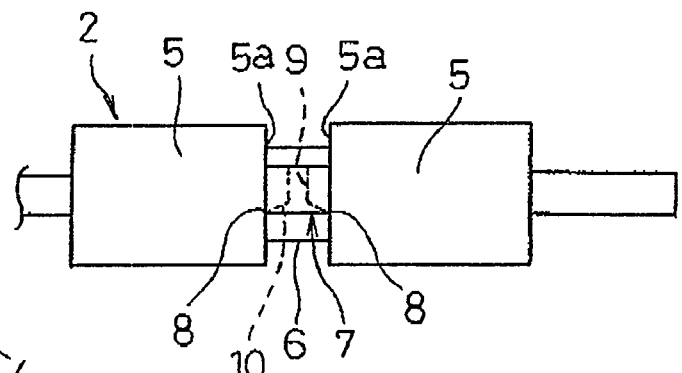

FIG. 1A shows a main part of the gravure coating apparatus, and FIG. 1B shows a gravure roll of the gravure coating apparatus. As shown in FIG. 1A, a strip-like electrode plate 1 having a plurality of stripe-shaped coated portions (not shown) formed on the surface thereof is continuously fed along a predetermined path while being guided by a guide roller (not shown). A gravure roll 2 is disposed such that the upper portion thereof comes into contact with the surface of the coated portions (not shown) formed on the lower surface of the fed electrode plate 1. The lower portion of the gravure roll 2 is immersed in a coating solution 3 contained in a solution container 4. In this embodiment, the coating solution 3 contains an inorganic oxide filler such as alumina, a binder therefor, and a solvent. After being applied and dried, the coating solution 3 forms a protection film composed of a porous insulating layer.

As shown in FIG. 1B, the gravure roll 2 is provided with a plurality of plate cylinders 5 corresponding to the plurality of the stripe-shaped coated portions formed on the electrode plate 1, and a groove 6 is provided between the plate cylinders 5. On the entire peripheral surface of each of the plate cylinders 5 is engraved a gravure pattern composed of recessed portions to be filled with the coating solution, and the coating solution in the recessed portions is transferred to the surface of the coated portions. Generally, the gravure roll 2 is driven to rotate such that the peripheral surface thereof moves in a direction opposite to the feeding direction of the electrode plate 1. However, the gravure roll 2 may be driven to rotate such that the peripheral surface thereof moves in the same direction as the feeding direction.

Figure 2A:
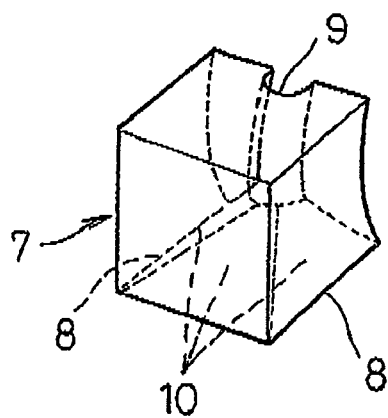
FIGS. 2A and 2B show a scraping member in the embodiment, FIG. 2A being a perspective view viewed from the outside, FIG. 2B being a perspective view viewed from the bottom side of a groove.
Figure 2B:
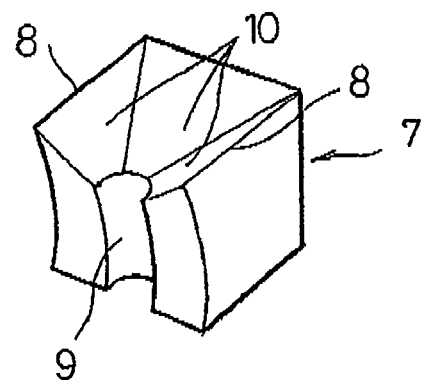
Figure 3:
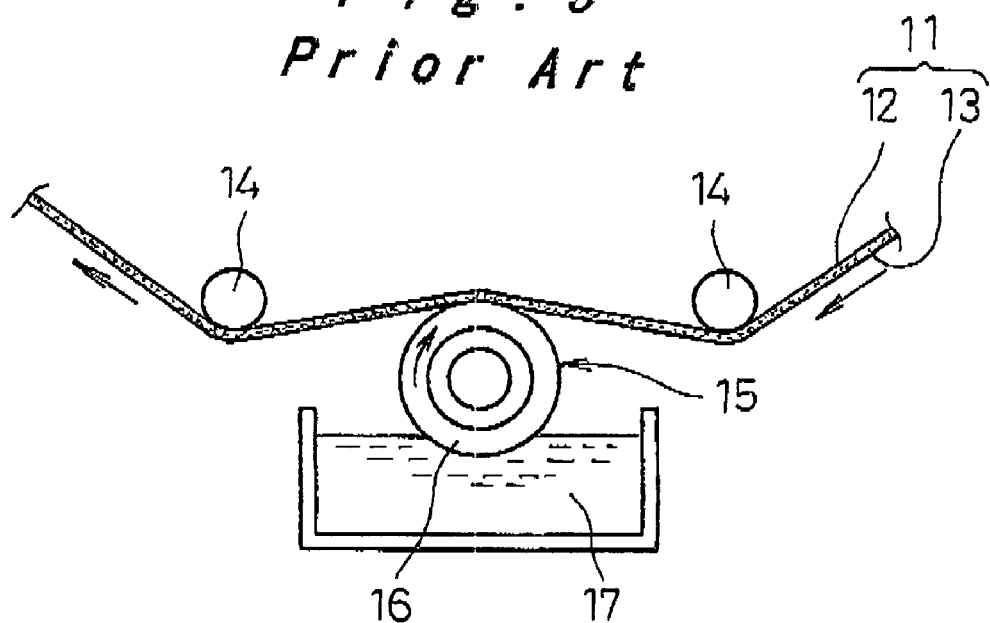
FIG. 3 is a schematic configuration diagram of a gravure coating apparatus of a conventional example.
Figure 4:
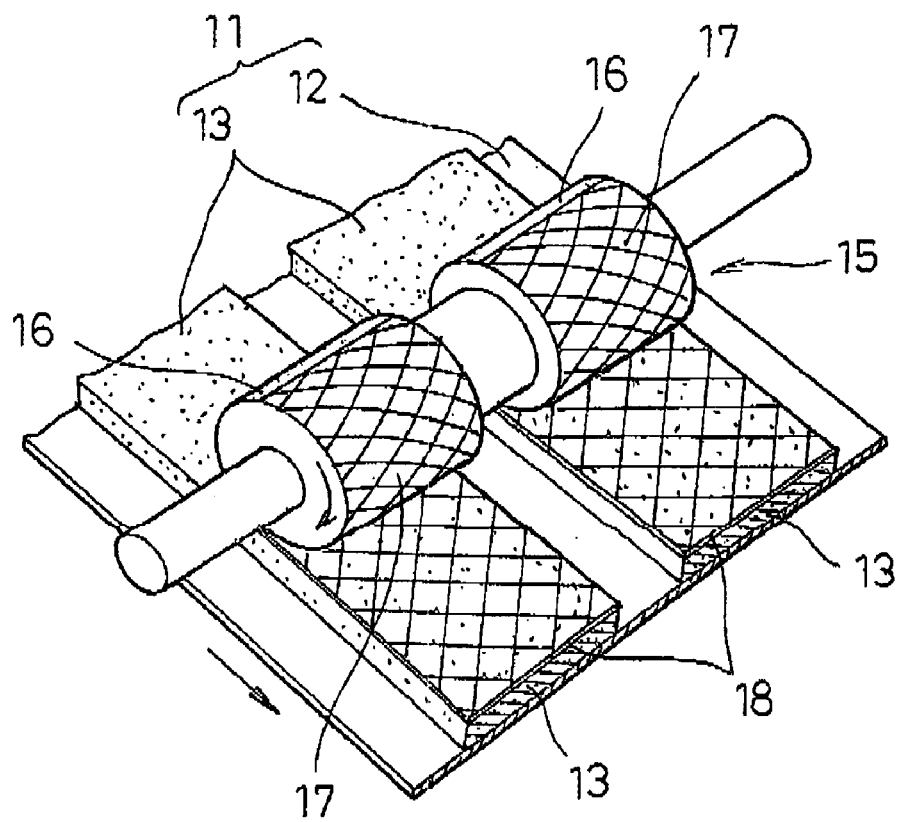
FIG. 4 is a perspective view illustrating a coating state in the conventional example, as viewed from the lower side.
Figure 5:
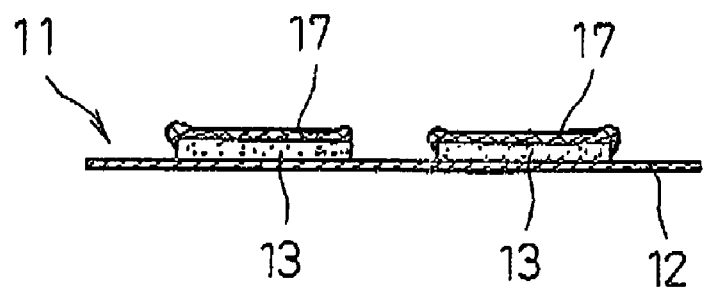
FIG. 5 is a cross-sectional view illustrating a state of a coating film formed in the conventional example.
Figures 6A, 6B:
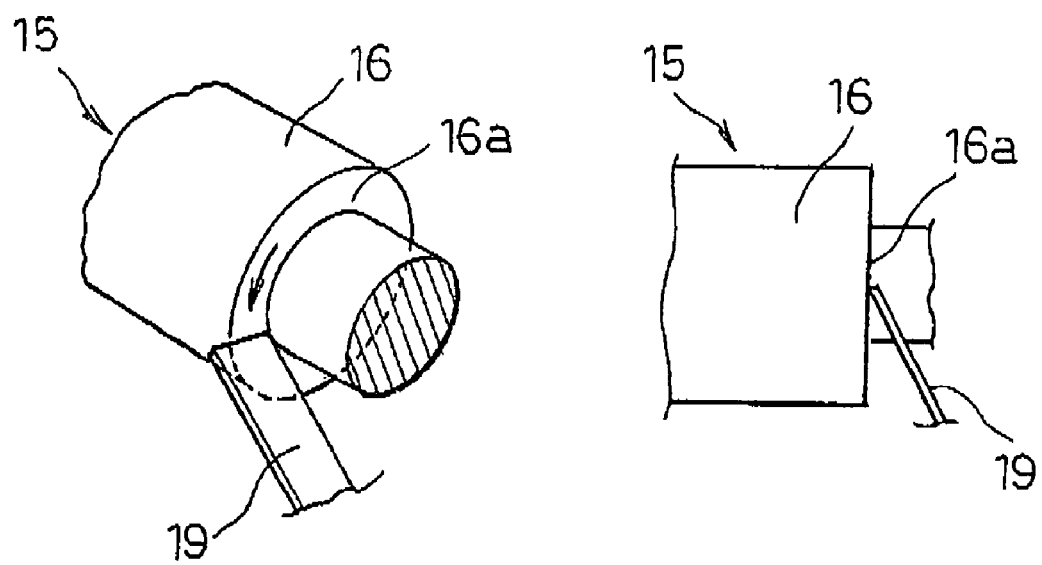
FIGS. 6A and 6B show means for scraping a coating solution on an edge surface of a plate cylinder in the conventional example, FIG. 6A being a perspective view, FIG. 6B being a front view.

In the groove 6 between the plate cylinders 5, a scraping member 7 is disposed which is positioned between a portion immersed in the coating solution 3 and a portion contacting the electrode plate 1. The scraping member 7 scrapes the coating solution 3 sticking to an edge surface of the plate cylinders 5 when the gravure roll 2 is rotated. As shown in FIGS. 2A and 2B, the scraping member 7 has two edges 8 for scraping the coating solution sticking to edge surfaces 5a of the respective plate cylinders 5. The edges 8 are provided in the side edge portions positioned upstream of the rotation direction of the gravure roll 2 and contact the respective edge surfaces 5a so as to be approximately aligned along the radial direction of the roll. Furthermore, a groove-shaped passage 9 for discharging the solution along the rotation direction of the roll is formed in an approximately central portion of an inner peripheral portion of the scraping member 7 with the peripheral portion being along the bottom surface of the groove 6. In addition to this, tapered surfaces 10 are formed on the scraping member 7, and guide the coating solution form both the edges 8 to the groove-shaped passage 9. The scraping member 7 is formed of a fluororesin such as polytetrafluoroethylene in order to provide repellency to the coating solution 3.

According to the above configuration, as the gravure roll 2 rotates, the coating solution 3 sticking to the edge surfaces 5a of the plate cylinders 5 is properly scraped by the edges 8 of the scraping member 7 disposed in the groove 6 between the plate cylinders 5 of the gravure roll 2 before the coating solution 3 comes in contact with the electrode plate 1. Furthermore, the scraped coating solution 3 smoothly flows along the tapered surfaces 10 toward the groove-shaped passage 9 and is discharged to the central portion of the bottom surface of the groove 6 through the groove-shaped passage 9. Thus, the coating solution 3 is returned to the solution container 4 without sticking again to the edge surfaces 5a of the plate cylinders 5. Therefore, the porous insulating film to be applied to and formed on the surface of the stripe-shaped coated portion of the electrode plate 1 is formed uniformly over the entire surface of each of the plate cylinders 5.

Furthermore, since a pressing mechanism necessary for a conventional scraper composed of a thin plate is eliminated, the scraping member 7 has a simple configuration. Thus, even when the width of the groove 6 is small, the coating solution 3 is properly scraped by simply placing a scraping member 7 corresponding to the small width. Furthermore, since the replacement of the scraping member 7 due to wear of the edges 8 is hardly required, the manufacturing process is not required to be interrupted for the replacement operations. High productivity is therefore ensured.

Moreover, the scraping member 7 is formed of a fluororesin having repellency to the coating solution 3. Therefore, even when the inclination angle of the tapered surfaces 10 (an inclination angle relative to a plane perpendicular to the edge surfaces 5a) is small, the coating solution scraped by the edges 8 is smoothly discharged through the groove-shaped passage 9. Furthermore, when the scraping member 7 is formed in a shape which sufficiently ensures the supporting strength of the edges 8, the scraping and removing action for the coating solution 3 is ensured.

Moreover, in this embodiment, the surface of the coated portion of the electrode plate 1 is gravure-coated with the coating solution containing an inorganic oxide filler and a binder therefor. Thus, a porous insulating film is formed uniformly on the surface of the active material-containing coated portion of the electrode plate 1 continuously for a long period of time without being interrupted by replacement of the scraper. The productivity in a manufacturing process of an electrode plate of a battery is thereby improved.

In the gravure coating apparatus of the present invention, the coating solution sticking to the edge surfaces of the plate cylinders is properly scraped by the scraping member disposed in the groove between the plate cylinders and is returned to the solution pool. Therefore, the coating film formed by the plate cylinders is made uniform over the entire surface. Furthermore, even when the width of the groove is small, the above effect is obtained by simply placing the scraping member in the groove. Moreover, since the replacement operations due to wear are not required, high productivity is ensured. Hence, the present gravure coating apparatus is useful for various applications in which a uniform coating film is formed in stripes. For example, the present gravure coating apparatus is particularly useful for a step of forming a coated portion or a porous insulating film on the surface of the coated portion in a process for manufacturing an electrode plate of various batteries.

While preferred embodiments of the invention have been described using specific terms, such description is for illustrative purposes only, and it is to be understood that changes and variations may be made without departing from the spirit or scope of the following claims.

What is claimed is:

1. A gravure coating apparatus for forming a stripe-shaped coating film by means of a gravure roll having a groove between a plurality of plate cylinders, the apparatus comprising
    a scraping member disposed in the groove and having:
        side edges each of which contacts an edge surface of one of the plate cylinders so as to be generally aligned along a radial direction of the gravure roll and scrapes a coating solution on the edge surface;
        a groove-like passage for discharging the coating solution, the groove-like passage being formed in a generally central portion of an inner peripheral portion along a bottom surface so as to be aligned along a rotation direction of the gravure roll; and
        a tapered surface which guides the coating solution from the side edges to the groove-like passage.

2. The gravure coating apparatus according to claim 1, wherein the scraping member is formed of a material having repellency to the coating solution.

3. The gravure coating apparatus according to claim 1 or 2, wherein the coating solution contains: an inorganic oxide filler which forms a porous insulating film on a surface of a coated portion containing an active material for an electrode plate of a battery; and a binder therefor.

4. The gravure coating apparatus according to claim 1, wherein a first side edge of said scraping member contacts an edge surface of a first plate cylinder of said plurality of plate cylinders and a second side edge of said scraping member contacts an edge surface of a second plate cylinder of said plurality of plate cylinders.

5. The gravure coating apparatus according to claim 4, wherein said first plate cylinder is disposed adjacent said second plate cylinder.

* * * * *